(12) United States Patent
Engelhardt et al.

(10) Patent No.: US 12,580,436 B2
(45) Date of Patent: Mar. 17, 2026

---

(54) STATOR ASSEMBLY FOR AN ELECTRIC MACHINE

(71) Applicant: Dr. Ing. h.c. F. Porsche Aktiengesellschaft, Stuttgart (DE)

(72) Inventors: Tobias Engelhardt, Stuttgart (DE); Michael Reinlein, Nuremberg (DE); David Bauer, Asperg (DE); Johannes Wende, Heilbronn (DE); Thomas Hubert, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 279 days.

(21) Appl. No.: 18/299,729

(22) Filed: Apr. 13, 2023

(65) Prior Publication Data

US 2023/0344292 A1 Oct. 26, 2023

(30) Foreign Application Priority Data

Apr. 22, 2022 (DE) ......................... 102022109794.3

(51) Int. Cl.
| | |
|---|---|
| *H02K 3/24* | (2006.01) |
| *H02K 5/20* | (2006.01) |
| *H02K 9/197* | (2006.01) |

(52) U.S. Cl.
CPC .............. *H02K 3/24* (2013.01); *H02K 5/203* (2021.01); *H02K 9/197* (2013.01)

(58) Field of Classification Search
CPC ............ H02K 1/165; H02K 1/16; H02K 3/24; H02K 3/04; H02K 5/20; H02K 5/203;
(Continued)

(56) References Cited

U.S. PATENT DOCUMENTS

| | | | | | |
|---|---|---|---|---|---|
| 1,302,040 | A | * | 4/1919 | Hellmund | ............ H02K 13/105 310/220 |
| 6,566,778 | B1 | * | 5/2003 | Hasegawa | .............. H02K 17/20 310/211 |

(Continued)

FOREIGN PATENT DOCUMENTS

| | | |
|---|---|---|
| DE | 102017206567 A1 | 10/2018 |
| DE | 102021104650 A1 | 9/2021 |

(Continued)

OTHER PUBLICATIONS

JP2010213412A Translation (Year: 2012).*
JP2014057506A (Year: 2014).*
JPS60144121A Translation (Year: 1985).*

*Primary Examiner* — Oluseye Iwarere
*Assistant Examiner* — Nicholas Lee Setzer
(74) *Attorney, Agent, or Firm* — LEYDIG, VOIT & MAYER, LTD.

(57) ABSTRACT

A stator assembly for an electric machine, including a sheet metal package, a winding assembly, and a collimator. The sheet metal package includes sheets and extends between a first and second axial end. The sheets include grooves forming groove pockets in the sheet metal package. The winding assembly extends through the groove pockets, the groove pockets at least partially including a first plurality of grooves configured as open grooves in a first axial region provided at the first axial end, a second plurality of grooves configured as open grooves in a second axial region provided at the second axial end, and a third plurality of grooves in at least one third axial region, the at least one third axial region lying between the first axial region and the second axial region. The third plurality of grooves are configured as closed grooves.

20 Claims, 4 Drawing Sheets

(58) Field of Classification Search
CPC .......... H02K 9/19; H02K 9/193; H02K 9/197;
H02K 9/20
USPC .................................... 310/216.015, 216.016
See application file for complete search history.

(56)                 References Cited

U.S. PATENT DOCUMENTS

| | | | | | |
|---|---|---|---|---|---|
| 10,749,386 | B2 | | 8/2020 | Tanaka et al. | |
| 2012/0098376 | A1 | * | 4/2012 | Ombach ................ | H02K 21/14 |
| | | | | | 310/156.01 |
| 2012/0256513 | A1 | * | 10/2012 | Kessler ................. | H02K 1/148 |
| | | | | | 310/216.016 |
| 2015/0084476 | A1 | * | 3/2015 | Jang ....................... | H02K 1/146 |
| | | | | | 310/216.016 |
| 2020/0007000 | A1 | * | 1/2020 | Berendes .............. | H02K 5/128 |
| 2020/0014266 | A1 | * | 1/2020 | Oechslen ............... | H02K 9/197 |
| 2020/0373800 | A1 | * | 11/2020 | Stoll ........................ | H02K 9/19 |
| 2020/0373803 | A1 | * | 11/2020 | Stoll ........................ | H02K 3/28 |
| 2021/0273500 | A1 | * | 9/2021 | Deng ................... | H02K 15/085 |
| 2022/0302775 | A1 | * | 9/2022 | Deng ...................... | H02K 9/19 |
| 2022/0385123 | A1 | * | 12/2022 | Seki ......................... | H02K 3/24 |

FOREIGN PATENT DOCUMENTS

| | | | | | | |
|---|---|---|---|---|---|---|
| GB | | 963880 | A | | 7/1964 | |
| JP | | 60144121 | A | * | 7/1985 | ............. H02K 1/148 |
| JP | | S60144121 | A | * | 7/1985 | |
| JP | | 2007151232 | A | | 6/2007 | |
| JP | | 2009183032 | A | | 8/2009 | |
| JP | | 2010213412 | A | * | 9/2010 | |
| JP | | 2014057506 | A | * | 3/2014 | |
| WO | WO 2018/180345 | A1 | | 10/2018 | | |

* cited by examiner

STATOR ASSEMBLY FOR AN ELECTRIC MACHINE

CROSS REFERENCE TO RELATED APPLICATIONS

This application claims benefit to German Patent Application No. DE 10 2022 109 794.3, filed on Apr. 22, 2022, which is hereby incorporated by reference herein.

FIELD

The invention relates to a stator assembly for an electric machine and an electric machine having such a stator assembly.

BACKGROUND

DE 10 2017 206 567 A1, U.S. Pat. No. 10,749,386 B2, DE 10 2021 104 650 A1, and JP 2007-151 232 A disclose a stator core having sheet metal fins, whose grooves are partially open and partially closed.

WO 2018/180 345 A1 discloses a stator core.

SUMMARY

In an embodiment, the present disclosure provides a stator assembly for an electric machine, the stator assembly being configured as an outer stator assembly for cooperating with an inner rotor and comprising a sheet metal package, a winding assembly, and a collimator. The sheet metal package comprises sheets and extends between a first axial end and a second axial end. The sheets comprise grooves, the grooves forming groove pockets in the sheet metal package. The winding assembly extends through the groove pockets, the groove pockets at least partially comprising a first plurality of grooves in a first axial region provided at the first axial end, the first plurality of grooves being configured as open grooves, a second plurality of grooves in a second axial region provided at the second axial end, the second plurality of grooves being configured as open grooves, and a third plurality of grooves in at least one third axial region, the at least one third axial region lying between the first axial region and the second axial region. The third plurality of grooves are configured as closed grooves.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
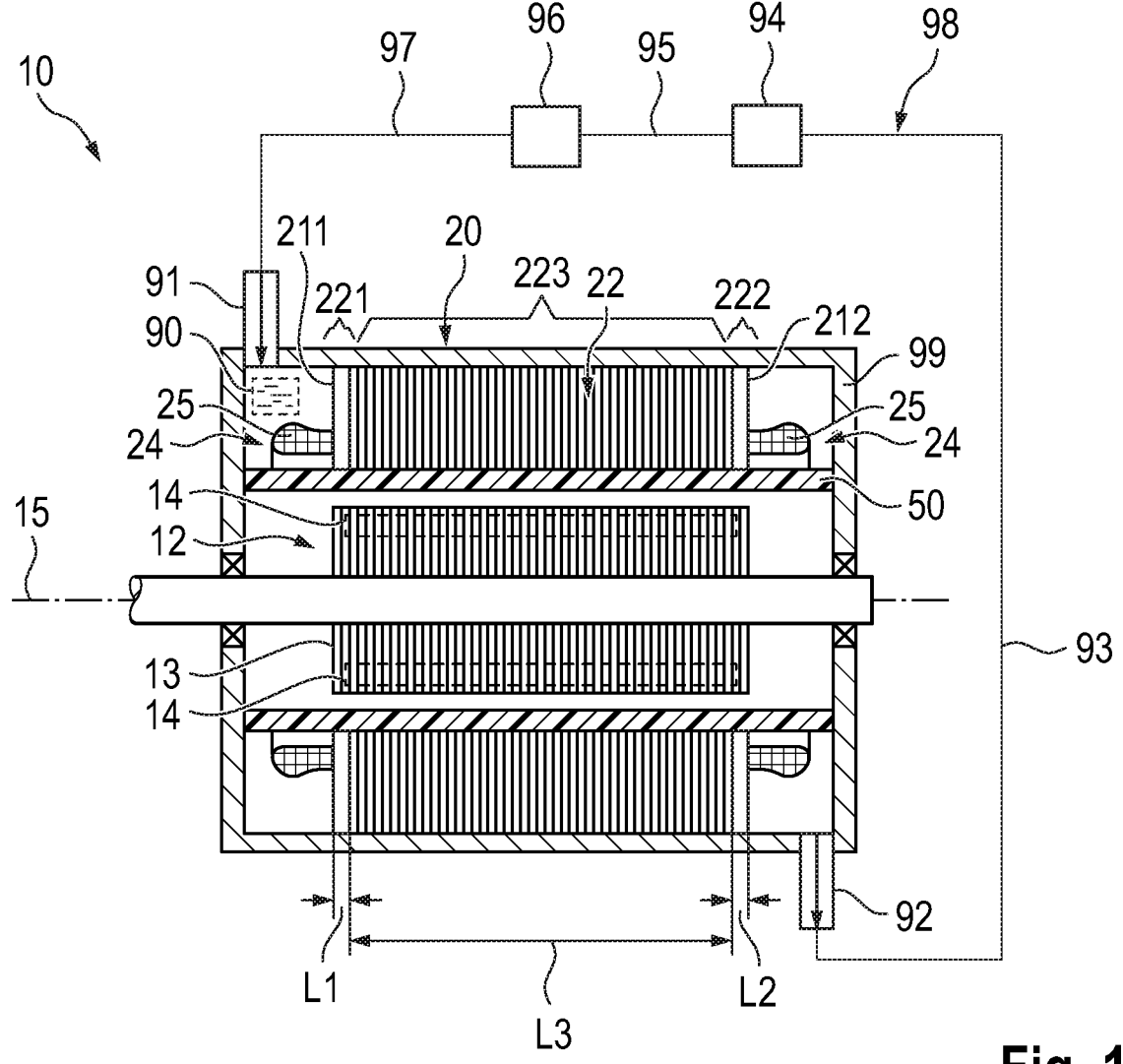
FIG. 1 illustrates in a schematic longitudinal section, an electric machine having a sheet metal package.

In an embodiment, the present invention provides a new stator assembly and a new electric machine.

A stator assembly for an electric machine is configured as an outer stator assembly for cooperating with an inner rotor and comprises a sheet metal package, a winding assembly, and a collimator, which sheet metal package comprises sheets and extends between a first axial end and a second axial end, which sheets comprise grooves, which grooves form groove pockets in the sheet metal package, which winding assembly extends through the groove pockets, which groove pockets at least partially comprise a first plurality of grooves in a first axial region provided at the first axial end, which are configured as open grooves, comprise a second plurality of grooves in a second axial region provided at the second axial end, which are configured as open grooves, comprise a third plurality of grooves in at least one third axial region, which lies between the first axial region and the second axial region, which grooves are configured as closed grooves.

In the axial regions comprising the axial ends, the grooves of the groove pockets are configured so as to be open, and thereby eddy current losses are comparatively significantly reduced. Between the axial edge regions, there is at least one third axial region having closed grooves, and this is advantageous for the stability of the stator assembly and in particular for the stability of the collimator. This provides a very advantageous combination. This configuration is particularly advantageous for high-performance electric machines in electric vehicles having a directly cooled winding assembly.

According to a preferred embodiment, the groove pockets in the first axial region comprise exclusively open grooves.

According to a preferred embodiment, the groove pockets in the second axial region comprise exclusively open grooves.

According to a preferred embodiment, in the third axial region, the groove pockets comprise exclusively closed grooves.

The effect of the open and closed grooves is thereby enhanced.

According to a preferred embodiment, the sheets having the open-ended grooves comprise stator teeth having a tooth neck and tooth heads at their radially inner end, between which stator teeth the open grooves are formed. This is an advantageous configuration of the open grooves.

According to a preferred embodiment, the stator teeth feature a flaring at least in portions at the transition from the tooth neck to the tooth head. Such a flaring improves the magnetic flux and partially delimits the stator groove on the radially inner side.

According to a preferred embodiment, the collimator is connected to the sheet metal package, in particular by an adhesive connection or by an additional adhesive. The stability and tightness in this region can be improved by this measure.

According to a preferred embodiment, the collimator comprises a plastic, in particular a fiber-reinforced plastic. On the one hand, plastic is magnetically non-conductive or poorly conductive, and on the other hand, it can be made very stable.

According to a preferred embodiment, the collimator seals the stator assembly on the radially inner side of the sheet metal package. A leakage of fluid towards the rotor can thereby be prevented.

According to a preferred embodiment, the stator assembly comprises a housing, which housing comprises an inlet and an outlet for a coolant, which housing comprises the collimator and which housing is configured so as to be fluid-tight between the inlet and the outlet in order to allow a cooling of the stator assembly by a coolant. Utilizing the collimator for the housing advantageously allows a coolant to flow through the groove pockets.

According to a preferred embodiment, the groove pockets are fluidically connected to the inlet and the outlet in order to allow a coolant flow through the groove pockets. This type of cooling is very effective. This is referred to as direct cooling.

According to a preferred embodiment,
the first axial region,
the second axial region, or
the first axial region and the second axial region
each comprise an axial extension, which is at least 5 mm, preferably at least 10 mm, further preferably at least 15 mm, and particularly preferably at least 20 mm. This axial extension enables an advantageous reduction of the eddy currents.

According to a preferred embodiment,
the first plurality,
the second plurality, or
the first plurality and the second plurality
is at least 2, preferably at least 5, further preferably at least 7, and particularly preferably at least 9. This number is suitable for smaller and larger sheet metal packages.

According to a preferred embodiment, the third plurality is at least 4, preferably at least 8, further preferably at least 12, and particularly preferably at least 15. This allows for a stable stator assembly.

An electric machine comprises such a stator assembly and a rotor assembly. This results in an advantageous electric machine that can be configured for high performance.

Further details and advantageous further developments of embodiments of the invention will emerge from the embodiment examples, which are described below and illustrated in the drawings and are not to be construed as limiting the invention in any way. It goes without saying that the features mentioned above and those yet to be discussed below can be used not only in the respectively specified combination, but also in other combinations or on their own, without leaving the scope of the present invention. Here:

Parts that are the same or have the same effect bear the same reference numerals in the following and are generally described only once. The descriptions of all of the figures build on one another in order to avoid unnecessary repetitions.

FIG. 1 shows an electric machine 10 having a stator assembly 20 and a rotor assembly 12. The electric machine can also be referred to as an electric motor in the event that it has a driving function. The stator assembly 20 has a housing 99 comprising a collimator 50.

The housing 99 has an inlet 91 and an outlet 92.

The outlet 92 is connected to a pump 94 via a conduit 93, the pump 94 is connected to a heat exchanger 96 via a conduit 95, and the heat exchanger 96 is connected to the inlet 91 via a conduit 97 in order to enable a coolant circuit 98. A coolant 90 is provided in the housing 99 and throughout the coolant circuit 98, which coolant is preferably fluid, in particular liquid and/or gaseous. Thin liquid coolants 90 such as insulating oil are well suited, which additionally improves electrical insulation and has dielectric properties. Transformer oils are particularly advantageous, which are stable even at comparatively high temperatures.

The stator assembly 20 comprises a sheet metal package 22 and a winding assembly 24. The winding assembly 24 comprises winding heads 25 on the two axial front sides of the sheet metal package 22.

The sheet metal package 22 extends between a first axial end 211 and a second axial end 212. In the exemplary embodiment, the sheet metal package 22 comprises a first axial region 221, a second axial region 222, and a third axial region 223.

The first axial region 221 extends over an axial length L1, the second axial region 222 extends over an axial length L2, and the third axial region 223 extends over an axial length L3.

In the exemplary embodiment, the rotor assembly 12 comprises a rotor core 13 with permanent magnets 14.

The stator assembly 20 defines an axis of rotation 15. The rotor assembly 12 rotates about the axis of rotation 15 and is configured as an inner rotor assembly. Accordingly, the stator assembly 20 is configured as an outer stator assembly.

Figure 2:
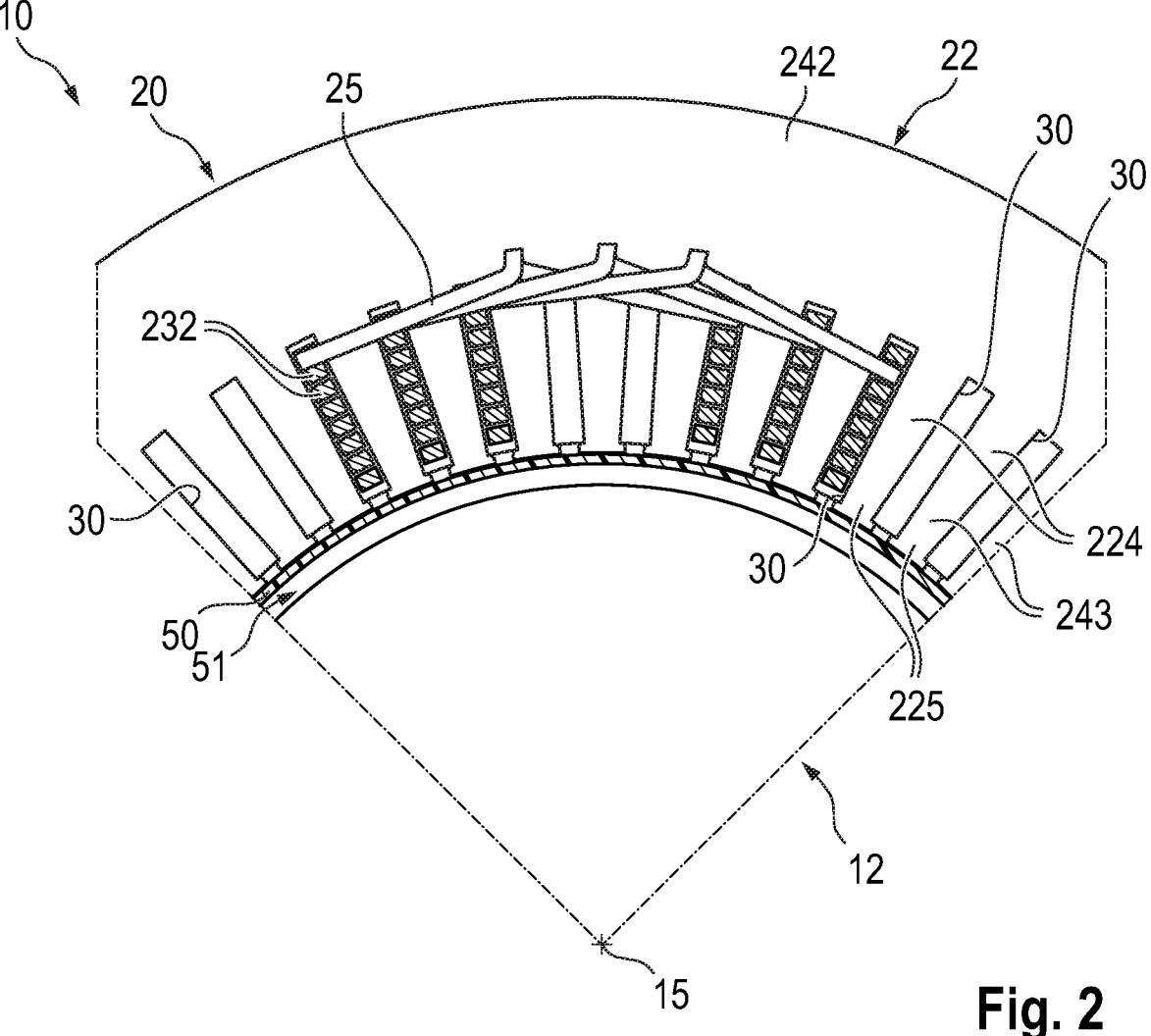
FIG. 2 illustrates in a schematic partial cross-section, the electric machine of FIG. 1.

In a top plan view, FIG. 2 shows a section of the stator assembly 20 and the rotor assembly 12.

The sheet metal package 22 has a magnetic yoke 242, which is also used as an anchor spine, and stator teeth 243. The stator teeth 243 define groove pockets 30.

The winding assembly 24 extends through the groove pockets 30, and the winding heads 25 are produced at the axial ends of the sheet metal package 22. In the exemplary embodiment, the stator assembly 20 is not yet fully mounted, and the winding assembly 24 or the winding wires 232 of the winding assembly 24 are only provided in a part of the groove pockets 30.

The stator teeth 243 each comprise a tooth neck 224 that extends inwardly, and tooth heads 225 are provided at the radially inner end of the stator teeth 243.

The collimator 50 is connected to the stator teeth 243 and seals the radially inner region of the stator teeth 243 towards the rotor assembly 12.

For example, the collimator 50 can be pre-configured as a plastic molded part and then glued to the sheet metal package 22 using an adhesive, or it can be produced by lamination of the sheet metal package 22, also referred to as a liner.

The collimator 50 is located in the air gap 51 between the sheet metal package 22 and the rotor assembly 12 and is preferably formed from a magnetically non-conductive or poorly conductive material. The air gap 51 is defined as the magnetically non-conductive or poorly conductive region between the sheet metal package 22 and the rotor core and can be partially filled with plastic, for example.

Preferably, the collimator 50 is formed from a plastic, in particular a fiber-reinforced plastic. However, additional materials can be present.

Figure 3:
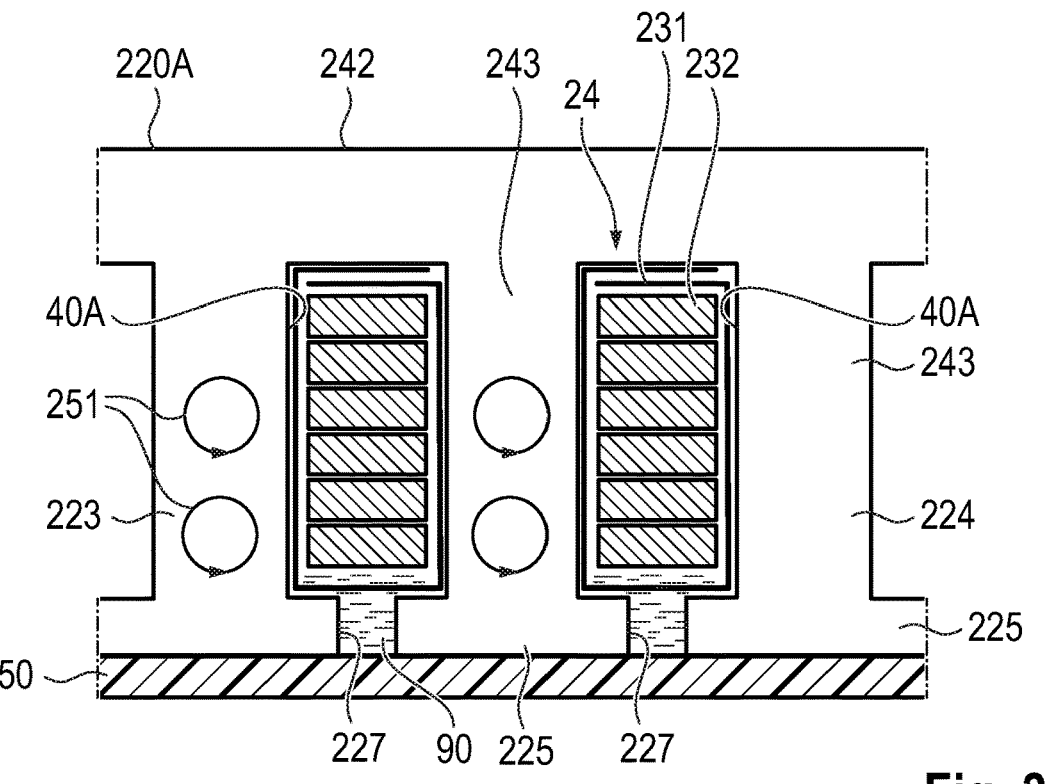
FIG. 3 illustrates in a schematic top plan view, the electric machine of FIG. 1 with a first variant of a sheet of the sheet metal package.

FIG. 3 schematically illustrates a sheet 220A of the sheet metal package 22. Preferably, such sheets are made from a soft-magnetic material, for example from electric sheet metal, in particular motor sheet metal or transformer sheet metal. For electrical insulation between the sheets 220A, they preferably comprise an insulation layer, for example a preferably thin varnish layer.

The stator teeth 243 comprise the tooth necks 224 and tooth heads 225. In the exemplary embodiment, the stator teeth 243 have a flaring as they transition from the tooth necks 224 to the tooth heads 225, i.e., they become wider in the circumferential direction. Alternatively, the tooth heads 225 can be formed without a flaring.

The tooth heads 225 of the adjacent stator teeth 243 are not connected to one another, and the grooves 40A formed between the stator teeth 243 therefore each have a groove opening 227. Open grooves 40A or, for widened tooth heads 225, half-closed or semi-closed grooves 40A are referred to, but are still open grooves 40A due to the groove opening 227 in the sheet 220A.

In the exemplary embodiment, a groove insulation 231 and copper conductors 232 of the winding assembly 24 are provided in the grooves 40A.

A cooling of the winding assembly 24 in the region of the grooves 40A is advantageous, because heat is generated there by Joule heat and iron losses.

Cooling by a coolant 90 in the region of grooves 40A can allow the coolant 90 to reach the collimator 50. When the coolant 90 is pressurized, the coolant 90 causes a pressure on the collimator 50. This can result in damage to the collimator 50, or can result in a detachment.

An advantage of the sheet 220A is that, by providing the groove openings 227, an electrical current flow in this region is prevented or at least weakened. As a result, the eddy currents 251, which can arise in the stator sheet 40A, are formed in comparatively small regions or rather locally.

The stator sheets 220A typically have an insulation layer that causes an insulation between the individual sheets 220A. This prevents or at least impedes the formation of large-area eddy currents across the sheets 220A.

Figure 4:
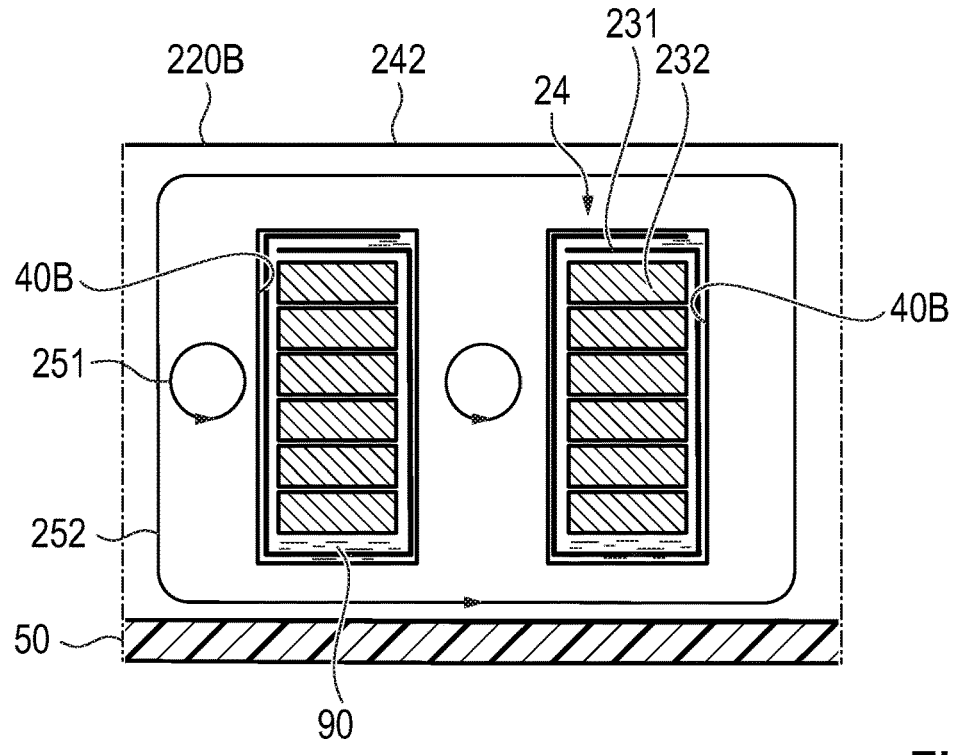
FIG. 4 illustrates in a schematic top plan view, the electric machine of FIG. 1 with a second variant of a sheet of the sheet metal package.

FIG. 4 shows a sheet 220B that is generally constructed the same as the sheet 220A of FIG. 3. Thus, the same material, the same sheet thickness, and the same insulation can be used.

The differences compared to the sheet 220A of FIG. 3 will now be discussed. The sheet 220B comprises grooves 40B configured as closed grooves 40B. Thus, the grooves 40B do not have groove openings, and the sheet 220B encloses the groove 40B on all sides (radially inside, radially outside, and in the circumferential directions).

The sheet 220B has the advantage that a coolant 90 in the grooves 40B in the region of the sheet 220B has no direct contact to the collimator 50, and the sheet 220B is more stable in the region of the grooves 40B, thereby reducing the risk of deformation. This increases the stability of the entire sheet metal package (cf. FIG. 1) and thus also the stability of the collimator 50. However, the coolant 90 can still influence the collimator in the region between the sheets 220B, but the working surface and thus the mechanical load on the collimator 50 are less.

One disadvantage of the sheet 220B is that, in addition to the local eddy currents 251, even larger-area eddy currents 252 can occur, because an electrical eddy current flow is also possible across the radially inner region of the sheet 220B and thus around one or more grooves 40B.

Figure 5:
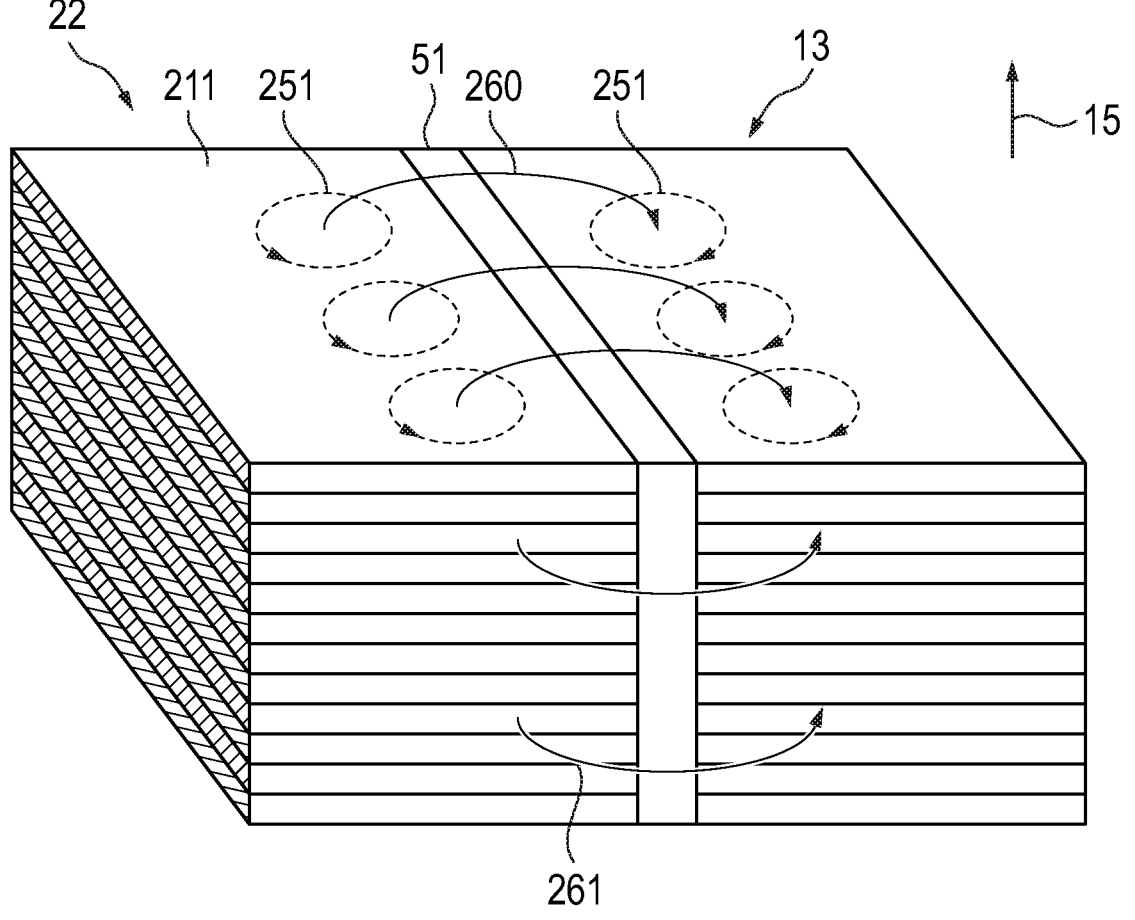
FIG. 5 illustrates in a schematic view, a magnetic flux in the front region of a sheet metal package.

FIG. 5 schematically shows the sheet metal package 22 and the rotor sheet metal package of the rotor core 13 as well as the air gap 51 between them. At the axial end 211 (and in the same manner 212), a magnetic flux 260 can exit axially and arcuately at high magnetic flux densities. This is also referred to as a fringing effect or flux fringing. This increasingly leads to eddy currents that close up laminarly in the sheet metal. For this reason, it is particularly advantageous to use sheets 220A of FIG. 3 at the axial end regions 221, 222 of FIG. 1, because they are eddy current-optimized, and thereby a comparatively strong reduction of eddy current losses is possible.

By contrast, in the central region 223 of the sheet metal package 22 of FIG. 1, it is particularly advantageous to use closed grooves 40B of the sheet 220B of FIG. 4 in order to achieve a stable configuration of the collimator 50 and the entire stator assembly 20.

As a result, it is advantageous for the groove pockets 30 (cf. FIG. 2) to all or at least partially comprise a first plurality of grooves 40A in the first axial region 221 provided at the first axial end 211, which are configured as open grooves 40A, comprise a second plurality of grooves 40A in the second axial region 222 provided at the second axial end 212, which are configured as open grooves 40A, comprise a third plurality of grooves 40B in the at least one third axial region 223, which lies between the first axial region 221 and the second axial region 222, which grooves are configured as closed grooves 40B.

Diverse variants and modifications are of course possible within the scope of the present application.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A stator assembly for an electric machine, the stator assembly being configured as an outer stator assembly for cooperating with an inner rotor and comprising:

a stator core formed from a sheet metal package;

a winding assembly; and a radially sealing can connected to the sheet metal package, wherein the sheet metal package comprises sheets and extends between a first axial end and a second axial end, wherein the sheets comprise grooves, the grooves forming groove pockets in the sheet metal package, wherein the winding assembly extends through the groove pockets, the groove pockets at least partially comprising:

a first plurality of grooves in a first axial region provided at the first axial end of the stator core, the first plurality of grooves being configured as open grooves, a second plurality of grooves in a second axial region provided at the second axial end of the stator core, the second plurality of grooves being configured as open grooves, and a third plurality of grooves in at least one third axial region, the at least one third axial region lying between the first axial region and the second axial region, wherein the third plurality of grooves are configured as closed grooves adjacent to the first plurality of grooves at the first axial end and the second plurality of grooves at the second axial end, enclosed radially on all sides by one or more regions of the sheet, and are without a groove opening, and wherein the can abuts a groove opening of the first plurality of grooves, a groove opening of the second plurality of grooves, and a radially inner enclosing portion of the third plurality of grooves.

2. The stator assembly according to claim 1, wherein the groove pockets in the first axial region comprise exclusively open grooves.

3. The stator assembly according to claim 1, wherein the groove pockets in the second axial region comprise exclusively open grooves.

4. The stator assembly according to claim 1, wherein the groove pockets in the third axial region comprise exclusively closed grooves.

5. The stator assembly according to claim 1, wherein the sheets with the open grooves comprise stator teeth, the stator teeth including a tooth neck and tooth heads at their radially inner end, between which stator teeth the open grooves are formed.

6. The stator assembly according to claim 5, wherein the stator teeth include a flaring at least in portions at a transition from the tooth neck to the tooth head.

7. The stator assembly according to claim 1, wherein the can comprises a plastic.

8. The stator assembly according to claim 1, wherein the can seals the stator assembly on a radially inner side of the sheet metal package.

9. The stator assembly according to claim 1, comprising a housing, wherein the housing comprises an inlet and an outlet for a coolant, wherein the housing comprises the can, and wherein the housing is configured so as to be fluid-tight between the inlet and the outlet in order to allow a cooling of the stator assembly by the coolant.

10. The stator assembly according to claim 9, wherein the groove pockets are fluidically connected to the inlet and the outlet in order to allow a coolant flow of the coolant through the groove pockets.

11. The stator assembly according to claim 1, wherein the first axial region and/or the second axial region extends axially at least 5 mm.

12. The stator assembly according to claim 1, wherein the first plurality of grooves and/or the second plurality of grooves includes at least 5 grooves.

13. The stator assembly according to claim 1, wherein the third plurality of grooves includes at least 4 grooves.

14. An electric machine comprising a stator assembly according to claim 1 and a rotor assembly.

15. The stator assembly according to claim 1, wherein the can is connected to the sheet metal package by an adhesive connection or by an additional adhesive.

16. The stator assembly according to claim 7, wherein the plastic is a fiber-reinforced plastic.

17. The stator assembly according to claim 11, wherein the first axial region and/or the second axial region extends axially at least 10 mm.

18. The stator assembly according to claim 12, wherein the first plurality of grooves and/or the second plurality of grooves includes at least 7 grooves.

19. The stator assembly according to claim 1, wherein the third plurality of grooves are enclosed on all sides by one or more regions of the sheet, wherein the at least one third axial region is continuous between the first axial end and the second axial end and adjacent to the first axial end and the second axial end, wherein the third axial region comprises the third plurality of grooves, and wherein each sheet of the sheet metal package in the third axial region comprises a respective closed groove of the third plurality of grooves.

20. The stator assembly according to claim 1, wherein the can abuts the sheet metal package along an entire circumference of the can for an entire axial length of the sheet metal package.

* * * * *